US011717379B2

(12) United States Patent
Clark

(10) Patent No.: US 11,717,379 B2
(45) Date of Patent: Aug. 8, 2023

(54) DENTAL WEDGE

(71) Applicant: David J. Clark, Tacoma, WA (US)

(72) Inventor: David J. Clark, Tacoma, WA (US)

(*) Notice: Subject to any disclaimer, the term of this patent is extended or adjusted under 35 U.S.C. 154(b) by 887 days.

(21) Appl. No.: 15/315,578

(22) PCT Filed: Jun. 4, 2015

(86) PCT No.: PCT/US2015/034162
§ 371 (c)(1),
(2) Date: Apr. 6, 2018

(87) PCT Pub. No.: WO2015/187927
PCT Pub. Date: Dec. 10, 2015

(65) Prior Publication Data
US 2017/0201515 A1    Jul. 13, 2017

Related U.S. Application Data

(60) Provisional application No. 62/007,661, filed on Jun. 4, 2014.

(51) Int. Cl.
*A61C 5/88* (2017.01)
(52) U.S. Cl.
CPC ...................... *A61C 5/88* (2017.02)
(58) Field of Classification Search
CPC .... A61C 5/80; A61C 5/82; A61C 5/85; A61C 5/88; A61C 15/02
USPC .................................................. 433/148–149
See application file for complete search history.

(56) References Cited

U.S. PATENT DOCUMENTS

| 154,867 | A | 9/1874 | Jarvis |
| 243,105 | A | 6/1881 | Chase |
| 309,709 | A | 12/1884 | Genese |
| 350,150 | A | 10/1886 | Parr |
| 351,065 | A | 10/1886 | Miller |
| 368,988 | A | 8/1887 | Williams |
| 388,620 | A | 8/1888 | Booth |

(Continued)

FOREIGN PATENT DOCUMENTS

| CA | 2195272 | 7/1998 |
| CA | 2223359 | 6/1999 |

(Continued)

OTHER PUBLICATIONS

PCT International Search Report and Written Opinion, PCT/US2015/034162, dated Oct. 28, 2015.

*Primary Examiner* — Edward Moran
(74) *Attorney, Agent, or Firm* — Quarles & Brady LLP

(57) ABSTRACT

The dental wedge has an elongated body extending from an outer end to an opposite inner end. The body includes a longitudinal intermediate wall, a longitudinal first side wall connected to the intermediate wall, and a longitudinal second side wall connected to the intermediate wall. The first side wall and the second side wall each flare away from the intermediate wall such that a first distal end of the first side wall and a second distal end of the second side wall are spaced apart creating an inverted generally V-shaped transverse section for the body. The body has a top surface and a bottom surface formed by the intermediate wall, the first side wall and the second side wall. The intermediate wall includes a region of increased flexibility compared to each of the first side wall and the second side wall.

23 Claims, 5 Drawing Sheets

(56) References Cited

U.S. PATENT DOCUMENTS

| | | | |
|---|---|---|---|
| 421,952 A | 2/1890 | Marshall | |
| 425,067 A | 4/1890 | Farrar | |
| 426,253 A | 4/1890 | Elliott | |
| 426,733 A | 4/1890 | Morey | |
| 427,338 A | 5/1890 | Marshall | |
| 436,603 A | 9/1890 | Ivory et al. | |
| 440,509 A | 11/1890 | Sawhill | |
| 442,107 A | 12/1890 | Davison | |
| 450,825 A | 4/1891 | Ivory | |
| 465,555 A | 12/1891 | Cross et al. | |
| 486,112 A | 11/1892 | Kuns | |
| 487,726 A | 12/1892 | Ellard | |
| 511,619 A | 12/1893 | Ivory | |
| 532,722 A | 1/1895 | Dennis | |
| 600,257 A | 3/1898 | Capwell | |
| 669,092 A | 3/1901 | Martin | |
| 777,821 A | 12/1904 | Walker | |
| 789,591 A | 5/1905 | Davis | |
| 791,859 A | 6/1905 | Barnes | |
| 819,136 A | 5/1906 | Herman | |
| 847,778 A | 3/1907 | Ivory | |
| 1,031,533 A | 7/1912 | Davison | |
| 1,133,379 A | 3/1915 | Hollingsworth | |
| 1,306,696 A | 6/1919 | Ivory | |
| 1,456,294 A | 5/1923 | Arrowsmith | |
| 1,464,532 A | 8/1923 | Ivory | |
| 1,568,054 A | 1/1926 | Burlew | |
| 1,702,869 A | 2/1929 | Ivory | |
| 1,806,718 A | 5/1931 | Spanier | |
| 1,829,898 A | 11/1931 | Ivory | |
| 2,150,005 A | 3/1939 | McNinch | |
| 2,311,141 A | 2/1943 | True | |
| 2,629,930 A | 3/1953 | Lane | |
| 2,782,503 A | 2/1957 | Thompson | |
| 2,867,905 A | 1/1959 | Meacham | |
| 2,891,313 A | 6/1959 | Crowley | |
| 2,897,598 A | 8/1959 | Kesling | |
| 3,096,585 A | 7/1963 | Dockum | |
| 3,193,094 A | 7/1965 | Schulstad | |
| 3,197,870 A | 8/1965 | Tofflemire | |
| 3,368,553 A | 2/1968 | Kirby | |
| 3,418,716 A | 12/1968 | Woods | |
| 3,473,226 A | 10/1969 | Arlers et al. | |
| 3,510,948 A | 5/1970 | Walthall | |
| 3,636,631 A | 1/1972 | Tofflemire | |
| 3,713,222 A | 1/1973 | Tofflemire | |
| 3,815,243 A | 6/1974 | Eames | |
| 3,837,082 A | 9/1974 | Pool | |
| 3,890,714 A * | 6/1975 | Gores | A61C 5/88 433/149 |
| 4,259,070 A | 3/1981 | Soelberg et al. | |
| 4,337,041 A * | 6/1982 | Harsany | A61C 5/88 433/149 |
| 4,425,093 A | 1/1984 | Lorenz | |
| 4,449,933 A | 5/1984 | Forni | |
| 4,468,199 A | 8/1984 | Weikel | |
| 4,578,035 A | 3/1986 | Pruitt | |
| 4,631,030 A | 12/1986 | von Weissenfluh | |
| 4,696,646 A | 9/1987 | Maitland | |
| 4,715,816 A | 12/1987 | Mogelof | |
| 4,878,508 A | 11/1989 | Durbin | |
| 5,035,615 A | 7/1991 | Din | |
| 5,199,869 A | 4/1993 | McGann | |
| 5,238,438 A | 8/1993 | Glickman | |
| 5,314,331 A | 5/1994 | Brosius et al. | |
| 5,318,446 A | 6/1994 | Slone | |
| 5,347,996 A | 9/1994 | Huan | |
| 5,421,725 A | 6/1995 | von Weissenfluh | |
| 5,527,181 A | 6/1996 | Rawls et al. | |
| 5,573,400 A | 11/1996 | Asher | |
| 5,743,738 A | 4/1998 | Baffelli et al. | |
| 5,788,499 A | 8/1998 | Hoffman | |
| 5,797,740 A | 8/1998 | Lundvik | |
| 5,890,900 A | 4/1999 | Fischer et al. | |
| 5,890,901 A | 4/1999 | Fischer et al. | |
| 5,993,210 A | 11/1999 | Godfrey | |
| 6,007,334 A | 12/1999 | Suhonen | |
| 6,074,210 A | 6/2000 | Garrison | |
| 6,079,978 A | 6/2000 | Kunkel | |
| 6,142,781 A | 11/2000 | Fischer | |
| 6,220,858 B1 | 4/2001 | McKenna et al. | |
| 6,234,793 B1 | 5/2001 | Brattesani et al. | |
| 6,375,463 B1 | 4/2002 | McLean et al. | |
| 6,402,514 B1 | 6/2002 | Fischer et al. | |
| 6,435,874 B1 | 8/2002 | Hughes | |
| 6,468,080 B1 | 10/2002 | Fischer et al. | |
| 6,482,007 B2 | 11/2002 | Stanwich et al. | |
| 6,589,053 B2 | 7/2003 | Bills | |
| 6,619,956 B1 | 9/2003 | Weir | |
| 6,666,683 B2 | 12/2003 | Mungcal | |
| 6,761,562 B2 | 7/2004 | Von Weissenfluh | |
| 6,890,176 B2 | 5/2005 | Hahn | |
| 7,175,432 B2 | 2/2007 | McDonald | |
| 7,223,101 B2 | 5/2007 | Garrison et al. | |
| 7,381,055 B2 | 6/2008 | Jabri | |
| 7,425,130 B2 | 9/2008 | Schaffner et al. | |
| 7,976,308 B2 | 7/2011 | Hegedus | |
| 8,047,843 B2 | 11/2011 | Clark | |
| 8,070,490 B1 | 12/2011 | Roetzer et al. | |
| 8,177,553 B2 | 5/2012 | Stoll | |
| 8,206,151 B2 | 6/2012 | McDonald | |
| 8,226,412 B1 | 7/2012 | Slone | |
| 8,425,228 B2 | 4/2013 | McDonald | |
| 8,435,035 B1 | 5/2013 | Fatiny | |
| 8,834,160 B1 | 9/2014 | Gottlieb et al. | |
| 9,456,880 B1 * | 10/2016 | Sanchez | A61C 5/88 |
| 9,572,635 B2 * | 2/2017 | Erskine-Smith | |
| 2002/0055084 A1 | 5/2002 | Fischer et al. | |
| 2002/0081552 A1 | 6/2002 | Stanwich et al. | |
| 2002/0192619 A1 | 12/2002 | Besek | |
| 2003/0113688 A1 | 6/2003 | Weissenfluh | |
| 2003/0129562 A1 | 7/2003 | Mungcal | |
| 2003/0186186 A1 | 10/2003 | Hahn | |
| 2004/0014006 A1 | 1/2004 | Garrison et al. | |
| 2004/0248064 A1 | 12/2004 | Rodriguez del Val | |
| 2004/0265779 A1 | 12/2004 | McDonald | |
| 2005/0118554 A1 | 6/2005 | Kilcher et al. | |
| 2005/0244787 A1 | 11/2005 | Summer | |
| 2005/0272005 A1 | 12/2005 | Schaffner et al. | |
| 2005/0282113 A1 | 12/2005 | Fraiman | |
| 2006/0100370 A1 | 5/2006 | Wellisz et al. | |
| 2006/0134579 A1 | 6/2006 | Kilcher et al. | |
| 2007/0087310 A1 | 4/2007 | Giusti | |
| 2007/0254263 A1 * | 11/2007 | McDonald | A61C 5/88 433/149 |
| 2008/0113315 A1 * | 5/2008 | Beggs | A61C 7/00 433/149 |
| 2008/0241787 A1 | 10/2008 | Hegedus | |
| 2009/0104581 A1 | 4/2009 | Simon | |
| 2009/0258325 A1 | 10/2009 | Zand | |
| 2011/0171596 A1 | 7/2011 | Clark | |
| 2011/0250563 A1 | 10/2011 | Horvath et al. | |
| 2011/0306007 A1 * | 12/2011 | Ericson | A61C 5/85 433/39 |
| 2012/0045734 A1 | 2/2012 | Thai | |
| 2012/0058447 A1 | 3/2012 | Liener et al. | |
| 2012/0164597 A1 | 6/2012 | McDonald | |
| 2013/0004914 A1 | 1/2013 | Marteney et al. | |
| 2013/0034827 A1 | 2/2013 | McDonald | |
| 2013/0122462 A1 | 5/2013 | Fatiny | |
| 2013/0149665 A1 | 6/2013 | Dragan | |
| 2013/0196285 A1 | 8/2013 | Effenberger et al. | |
| 2014/0120497 A1 | 5/2014 | Marteney et al. | |
| 2014/0342311 A1 * | 11/2014 | McDonald et al. | |
| 2014/0356811 A1 | 12/2014 | Erskine-Smith | |
| 2015/0282896 A1 * | 10/2015 | Ulsø | A61C 5/88 433/148 |

FOREIGN PATENT DOCUMENTS

| | | |
|---|---|---|
| DE | 3816501 A1 | 11/1989 |
| DE | 19751032 A1 | 5/1999 |
| DE | 19936461 A1 | 2/2001 |

(56) References Cited

FOREIGN PATENT DOCUMENTS

| | | |
|---|---|---|
| DE | 10119733 A1 | 10/2002 |
| DE | 10129518 A1 | 1/2003 |
| GB | 435004 | 9/1935 |
| GB | 454711 | 10/1936 |
| GB | 2471904 A | 1/2011 |
| WO | 9014051 A1 | 11/1990 |
| WO | 9216158 A1 | 10/1992 |
| WO | 9618353 A1 | 6/1996 |
| WO | 9927866 A1 | 6/1999 |
| WO | 02080802 A2 | 10/2002 |
| WO | 03065921 A1 | 8/2003 |
| WO | 03071977 A1 | 9/2003 |
| WO | 2004004591 A1 | 1/2004 |
| WO | 2010085364 A1 | 7/2010 |
| WO | 2012171018 A1 | 12/2012 |
| WO | 2013104017 A1 | 7/2013 |
| WO | 2014018162 A2 | 1/2014 |

\* cited by examiner

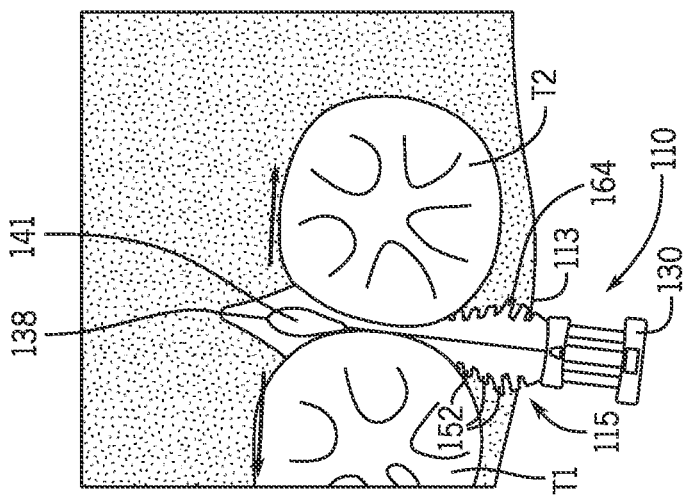
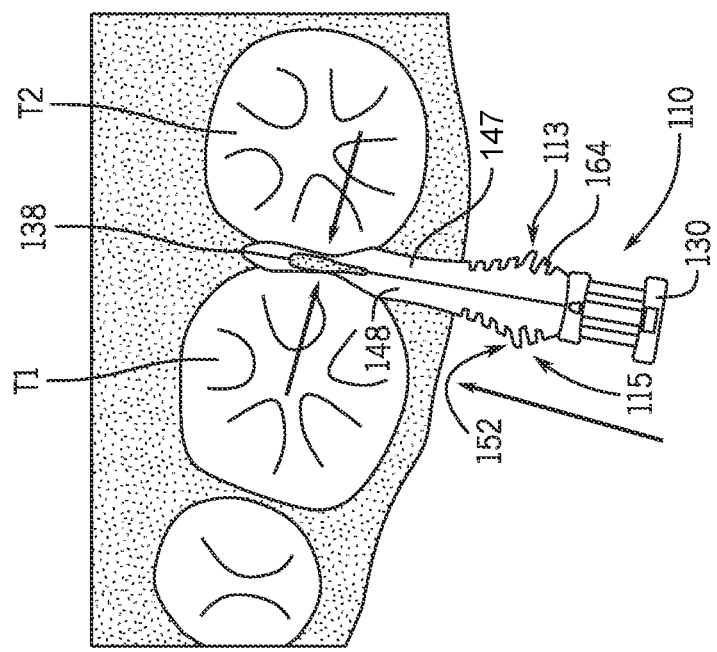
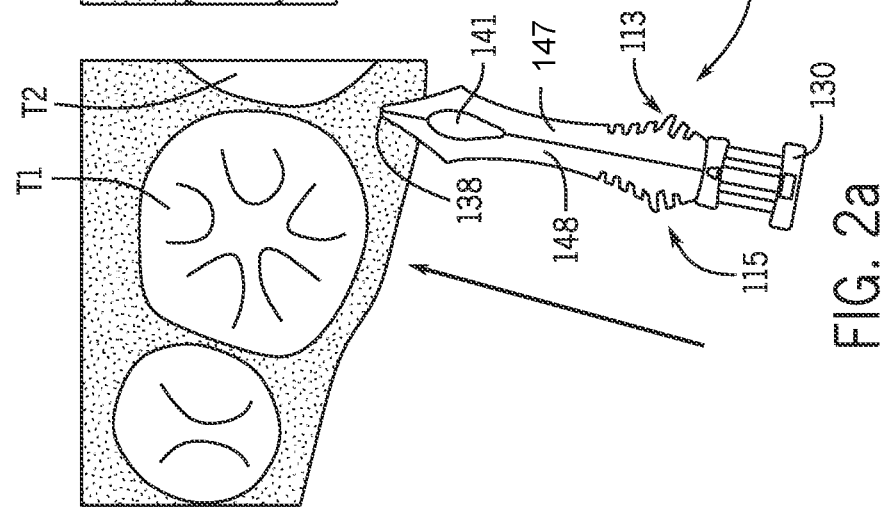

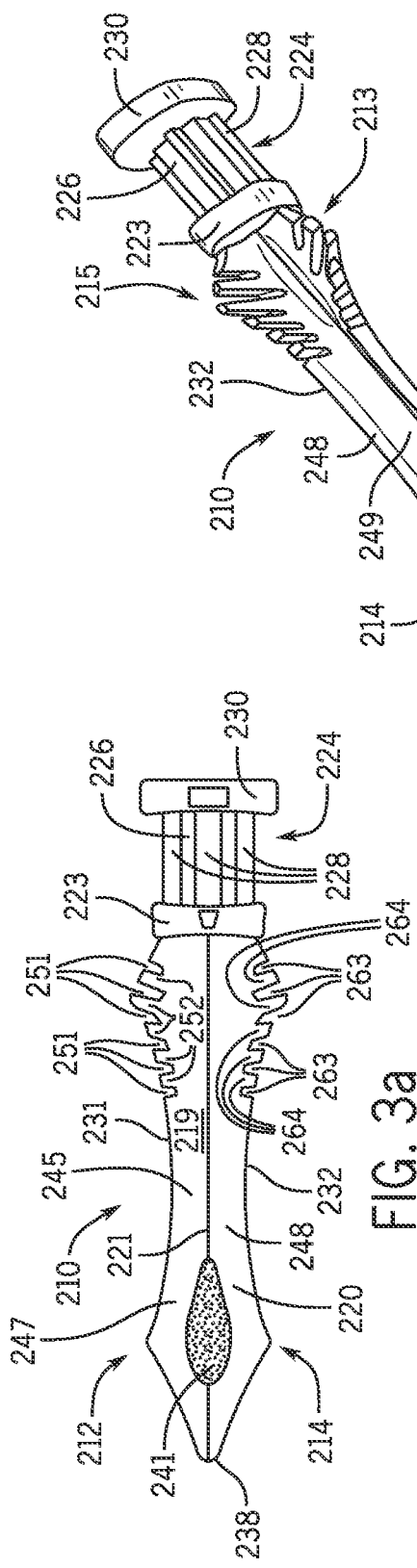
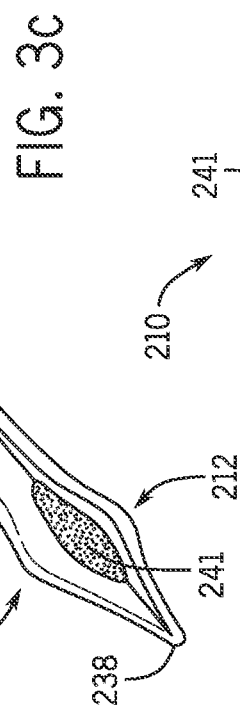
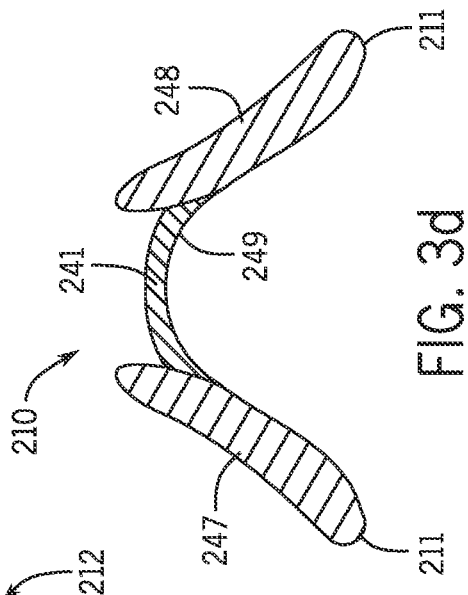
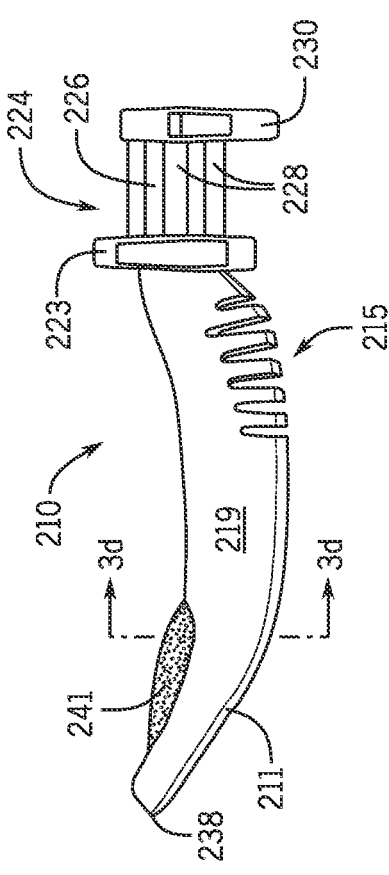

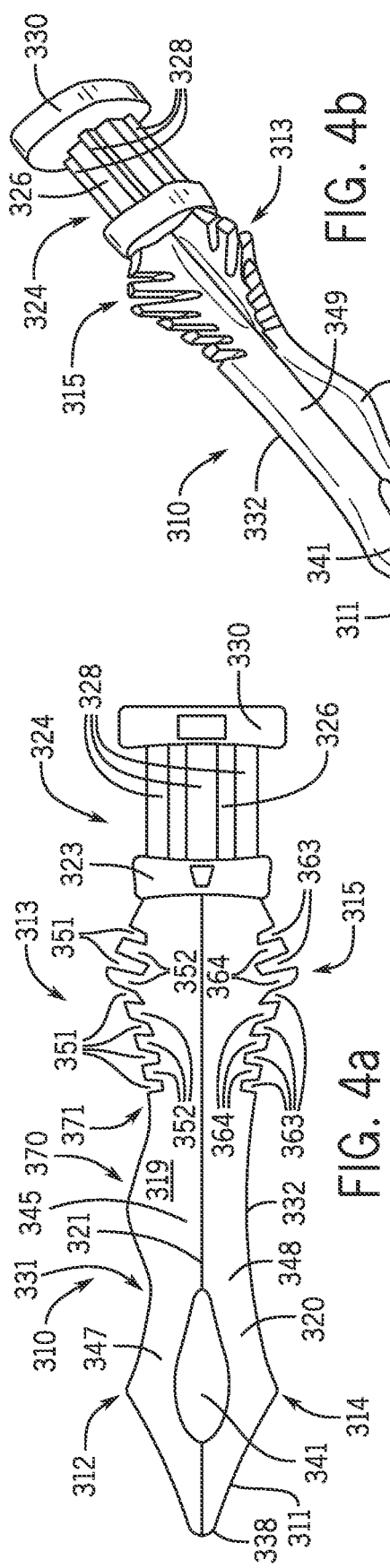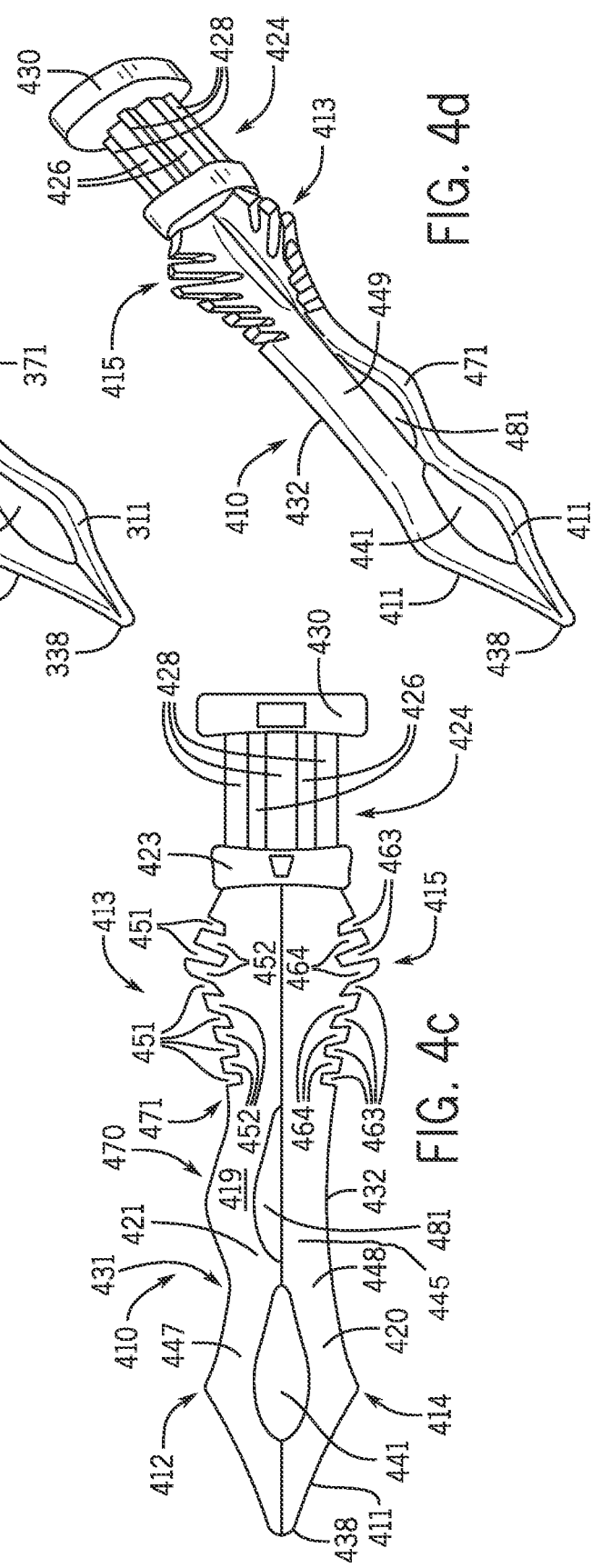

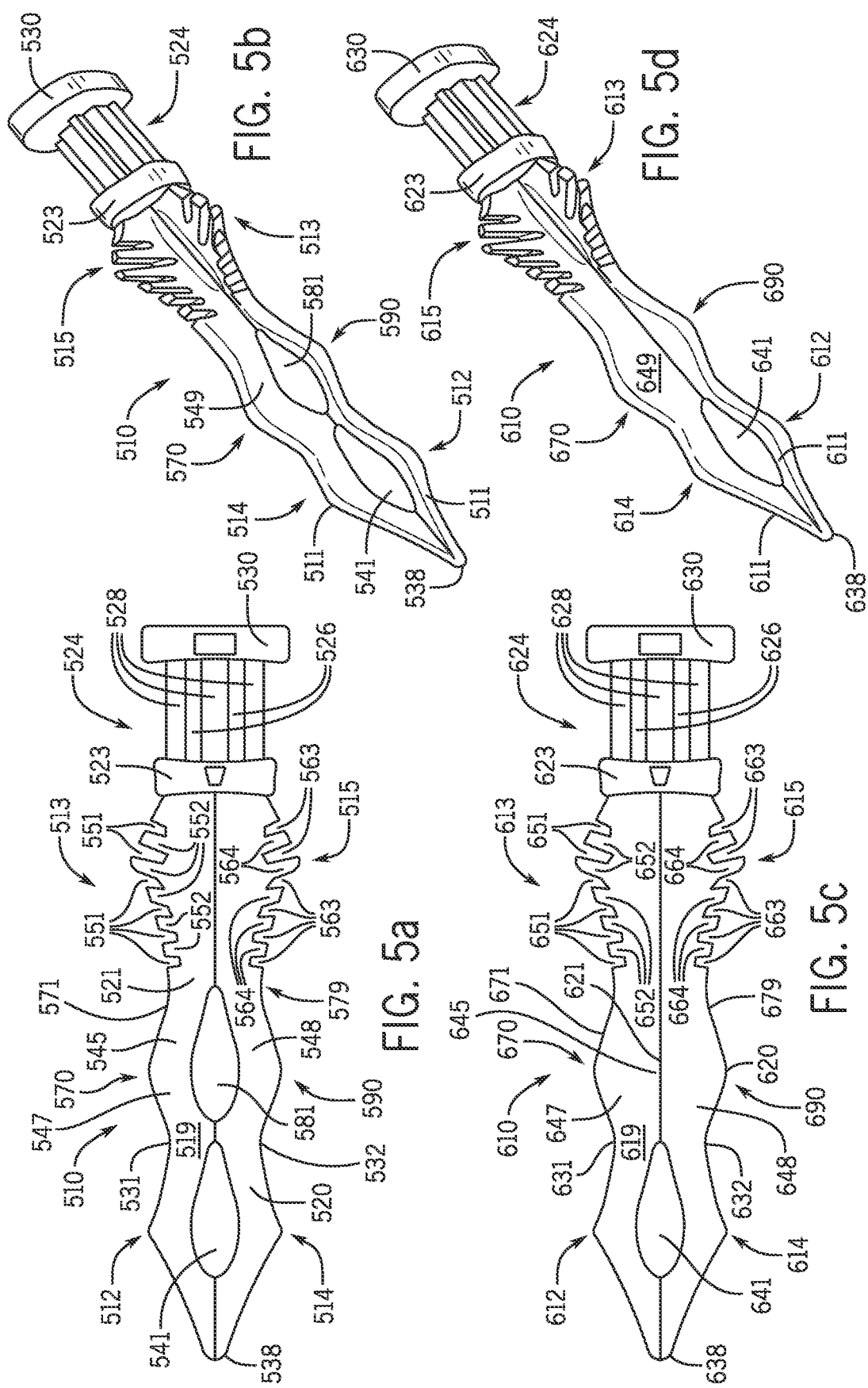

DENTAL WEDGE

CROSS-REFERENCE TO RELATED APPLICATIONS

This application represents the national stage entry of PCT International Application No. PCT/US2015/034162 filed on Jun. 4, 2015 and claims priority to U.S. Patent Application Ser. No. 62/007,661 filed Jun. 4, 2014, both of which are incorporated herein by reference for all purposes.

STATEMENT REGARDING FEDERALLY SPONSORED RESEARCH

Not Applicable.

BACKGROUND OF THE INVENTION

1. Field of the Invention

The present invention relates to dental wedges that may be used in restorative dentistry.

2. Description of the Related Art

Dental wedges have been implemented for decades in restorative dentistry. The first wedges were triangular solid wedges that were triangular in cross section and in top view. The disadvantage of wooden wedges is that in the top view aspect the triangular shape created the directional forces to lead to dislodging of the wedge in the opposite direction that the wedge was inserted. This would result in problems for the dentist such as periodically needing to push the wedge further between the teeth as it periodically loosened. If the dentist was unaware the wedge had slid out partially, the resulting contact could be deficient because of insufficient lateral pressure on the interproximal surfaces of the tooth. Another disadvantage of solid wooden wedges was that they often traumatize the soft tissue (papilla) between the teeth.

Flexible plastic wedges have since been introduced have an insertion path that is buccal to lingual or lingual to buccal. See, for example, U.S. Patent Application Publication No. 2011/0171596, U.S. Patent Application Publication No. 2007/0254263, and U.S. Pat. No. 6,074,210. In top view, there are also some hourglass shaped flexible wedges that give better anatomic adaptation of the contact area which is essentially two approximating radii. The hourglass shape helps to keep the wedge from backing out of the contact area. These wedges often have a hollow gingival surface which can lessen the trauma to the papilla and allow easier insertion of the wedge. The drawback to most of these wedges is that they are so flexible that lateral forces generated to separate the teeth and to seal the gingival aspect of the matrix to eliminate surplus filling material is lacking. In the case of the dental wedge of U.S. 2011/0171596, the stiffer side walls and more exaggerated, better fitted hourglass shape created better wedging pressures and a better fit and seal of the matrix but the wider flare of the hip of the tip, and stronger sidewalls at the tip makes the dental wedge of U.S. 2011/0171596 more difficult to place as the doctor attempts to push the tip through the narrow constriction (maximum constricted zone) at the center of the contact area where the two radii are closest together.

Elastic strips with hourglass shapes have also been introduced that snap into position utilizing an occluso-gingival insertion path. These elastic wedging devices are not as popular as traditional wedges because of several factors including difficulty in placement and tendency to rise up away from the gum tissue and interfere with the contact area.

Current wedges may not account for certain anatomic variations. An anatomic variation sometimes present is a mid-tooth concavity where the maximum constriction zone is normally positioned. This anatomic variation is common on the mesial of maxillary first bicuspids. This presents as a gradual smooth indentation.

A different mid tooth concavity, a furcation, is present in a different situation than the above mentioned fluting. It is also present in some aging adults in the case of a tooth where bone and gum recession have exposed a deeper area of the root where mid tooth concavities are present on many posterior teeth where the teeth begin to separate into multiple roots. This is termed a furcation and is generally a gull wing concavity with a sharp indentation.

Thus, there is a need for improved dental wedges that are easier to insert, that stay in position after insertion, and that account for anatomic variations.

SUMMARY OF THE INVENTION

The present invention provides a dental wedge that meets the foregoing needs.

In one form, the dental wedge includes a slot or a series of slots in the top ridge area of the wedge allowing a temporary collapse of opposed walls of the wedge required to pass through the narrowest portion of the interproximal area of the tooth or teeth to be filled.

In another form, the dental wedge may include a material weakness (in lieu of an outright slot) in the top ridge area of the wedge in the tip portion of the wedge with a thinning of the ridge area wherein the thickness of the wedge is abruptly or gradually reduced in a range of 1% to 99% of the surrounding wall thickness.

In another form, the dental wedge may include multiple side notches (e.g., 2-100) in lateral wall sections of one or more of first, second, third, fourth, fifth and sixth protruding regions of the wedge to allow better adaptation and easier insertion through the maximum constricted zone between adjacent teeth.

In another form, the dental wedge may include one or more (and up to all) of the above features allowing a stiffer and/or thicker ridge and side wall areas than would normally otherwise be practical during normal buccal to lingual or lingual to buccal insertion through the maximum constriction zone between adjacent teeth.

In one aspect, the present invention provides a dental wedge having an elongated body extending from an outer end to an opposite inner end. The body includes a longitudinal intermediate wall, a longitudinal first side wall connected to the intermediate wall, and a longitudinal second side wall connected to the intermediate wall. The first side wall and the second side wall each flare away from the intermediate wall such that a first distal end of the first side wall and a second distal end of the second side wall are spaced apart creating an inverted generally V-shaped transverse section for the body. The body has a top surface and a bottom surface formed by the intermediate wall, the first side wall and the second side wall. The intermediate wall includes a region of increased flexibility compared to each of the first side wall and the second side wall.

The region of increased flexibility may be a throughhole in the intermediate wall. The region of increased flexibility may be a portion of material weakness between the first side wall and the second side wall. The portion of material weakness may comprise a first thickness of the intermediate wall less than a thickness of either of the first side wall and the second side wall. The portion of material weakness may comprise a first material that has increased flexibility compared to a second material comprising surrounding sections of the first side wall and the second side wall.

The first side wall may include a first outwardly protruding region, the second side wall may include a second outwardly protruding region, and the region of increased flexibility may be positioned in the intermediate wall between the first outwardly protruding region and the second outwardly protruding region. The first outwardly protruding region and the second outwardly protruding region may be located adjacent the inner end of the body. The first side wall may include a third outwardly protruding region located adjacent the outer end of the body, and the first outwardly protruding region and the third outwardly protruding region may define a first concave section of the first side wall. The second side wall may include a fourth outwardly protruding region located adjacent the outer end of the body, and the second outwardly protruding region and the fourth outwardly protruding region may define a second concave section of the second side wall. The third outwardly protruding region of the first side wall may include notches defining at least one movable tab in the first side wall, and the fourth outwardly protruding region of the second side wall may include notches defining at least one movable tab in the second side wall.

The intermediate wall may include a second region of increased flexibility compared to each of the first side wall and the second side wall. The second region of increased flexibility may comprise a second throughhole in the intermediate wall. The second region of increased flexibility may comprise a second portion of material weakness between the first side wall and the second side wall.

In another aspect, the dental wedge has an elongated body extending from an outer end to an opposite inner end. The body includes a longitudinal intermediate wall, a longitudinal first side wall connected to the intermediate wall, and a longitudinal second side wall connected to the intermediate wall. The first side wall and the second side wall each flare away from the intermediate wall such that a first distal end of the first side wall and a second distal end of the second side wall are spaced apart creating an inverted generally V-shaped transverse section for the body. The body has a top surface and a bottom surface formed by the intermediate wall, the first side wall and the second side wall. The first side wall includes a first outwardly protruding region having notches defining at least one movable tab in the first side wall. The second side wall may include a second outwardly protruding region having notches defining at least one movable tab in the second side wall. The first outwardly protruding region of the first side wall may be located adjacent the outer end of the body, and the second outwardly protruding region of the second side wall may be located adjacent the outer end of the body. The intermediate wall may include a region of increased flexibility compared to each of the first side wall and the second side wall. The region of increased flexibility may comprise a throughhole in the intermediate wall. The region of increased flexibility may comprise a portion of material weakness between the first side wall and the second side wall.

In another aspect, the dental wedge has an elongated body extending from an outer end to an opposite inner end. The body includes a longitudinal intermediate wall, a longitudinal first side wall connected to the intermediate wall, and a longitudinal second side wall connected to the intermediate wall. The first side wall and the second side wall each flare away from the intermediate wall such that a first distal end of the first side wall and a second distal end of the second side wall are spaced apart creating an inverted generally V-shaped transverse section for the body. The body has a top surface and a bottom surface formed by the intermediate wall, the first side wall and the second side wall. The first side wall includes a first outwardly protruding region located adjacent the inner end of the body, the first side wall includes a second outwardly protruding region located adjacent the outer end of the body, and the first side wall includes a third outwardly protruding region located between the first outwardly protruding region and the second outwardly protruding region. The second side wall may include a fourth outwardly protruding region located adjacent the inner end of the body, the second side wall may include a fifth outwardly protruding region located adjacent the outer end of the body, and the second side wall may include a sixth outwardly protruding region located between the first outwardly protruding region and the second outwardly protruding region.

It is therefore one advantage of the present invention to provide a dental wedge that is easier to insert between adjacent teeth.

It is another advantage of the present invention to provide a dental wedge that stays in position after insertion between adjacent teeth.

It is another advantage of the present invention to provide a dental wedge that accounts for anatomic variation in teeth.

These and other features, aspects, and advantages of the present invention will become better understood upon consideration of the following detailed description, drawings and appended claims.

BRIEF DESCRIPTION OF THE DRAWINGS

FIG. 1a is a top plan view of a first embodiment of a dental wedge according to the invention.

FIG. 1b is a side view of the dental wedge of FIG. 1a, the opposite side view being a mirror image thereof.

FIG. 1c is a bottom perspective view of the dental wedge of FIG. 1a.

FIG. 2a is a top plan view of the dental wedge of FIGS. 1a-1c before insertion between adjacent teeth.

FIG. 2b is a top plan view of the dental wedge of FIGS. 1a-1c during insertion between adjacent teeth.

FIG. 2c is a top plan view of the dental wedge of FIGS. 1a-1c after insertion between adjacent teeth.

FIG. 3a is a top plan view of a second embodiment of a dental wedge according to the invention.

FIG. 3b is a side view of the dental wedge of FIG. 3a, the opposite side view being a mirror image thereof.

FIG. 3c is a bottom perspective view of the dental wedge of FIG. 3a.

FIG. 3d is a cross-sectional view of the dental wedge of FIG. 3a taken along line 3d-3d of FIG. 3b.

FIG. 4a is a top plan view of a third embodiment of a dental wedge according to the invention.

FIG. 4b is a bottom perspective view of the dental wedge of FIG. 4a.

FIG. 4c is a top plan view of a fourth embodiment of a dental wedge according to the invention.

FIG. 4d is a bottom perspective view of the dental wedge of FIG. 4c.

FIG. 5a is a top plan view of a fifth embodiment of a dental wedge according to the invention.

FIG. 5b is a bottom perspective view of the dental wedge of FIG. 5a.

FIG. 5c is a top plan view of a sixth embodiment of a dental wedge according to the invention.

FIG. 5d is a bottom perspective view of the dental wedge of FIG. 5c.

Like reference numerals will be used to refer to like parts from Figure to Figure in the following description of the drawings.

DETAILED DESCRIPTION OF THE INVENTION

Figures 1A, 1B, 1C:
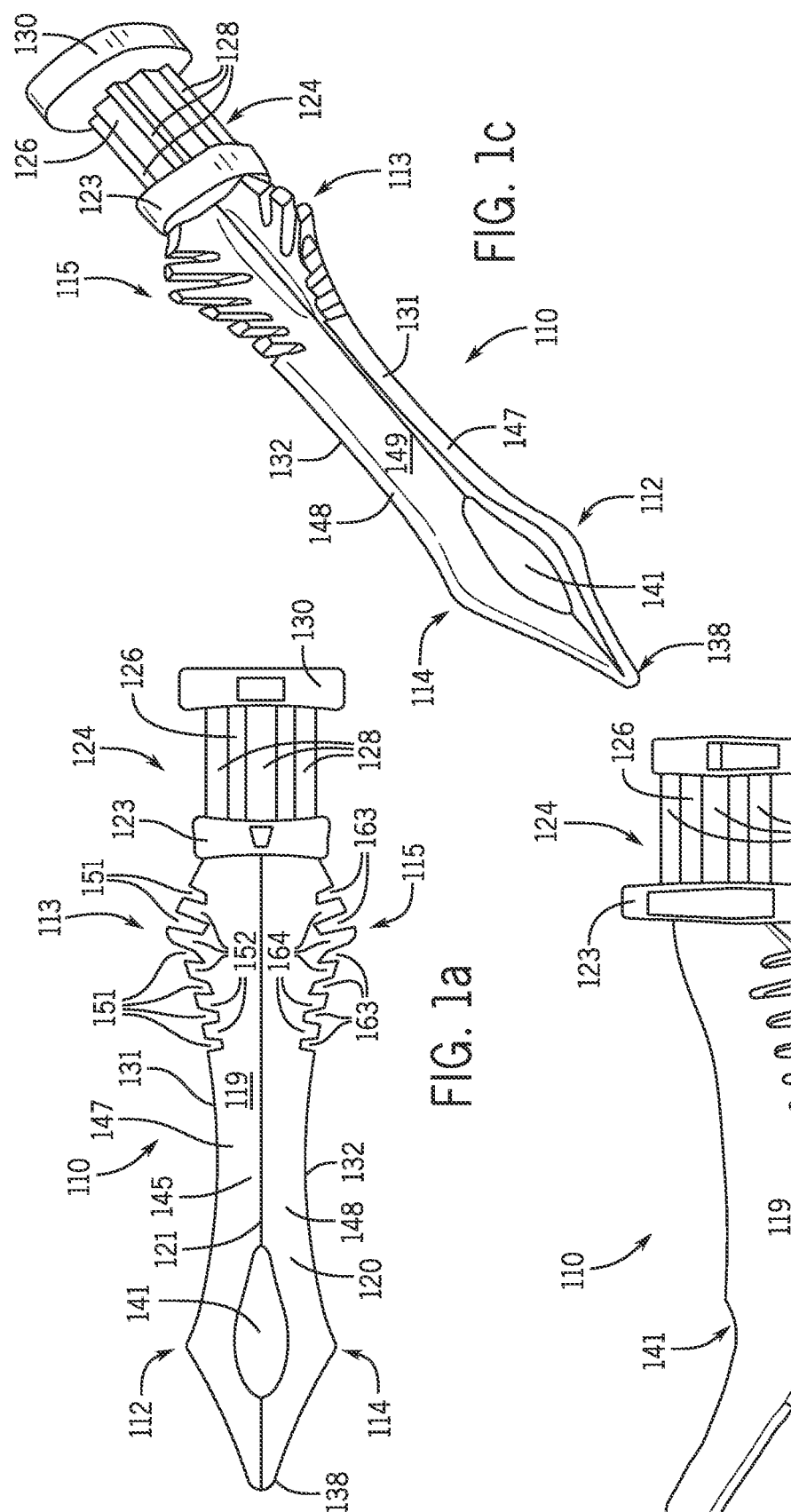

The use of relative terms such as "top", "bottom", "front", "rear", "inner", "left", "outer", "right", and the like when describing the dental wedges of the invention is not intended to limit the orientation in which the dental wedge may be used. Such relative terms merely serve to more conveniently describe the invention. Unless the context clearly indicates the contrary, "top" will refer to the direction toward the closed end of the dental wedge, "bottom" will refer to the direction toward the open end of the dental wedge, "inner" or "left" will refer to the direction toward the end of the dental wedge that is first inserted between adjacent teeth, "outer" or "right" will refer to the direction toward the end of the dental wedge that is grasped when the dental wedge is inserted between adjacent teeth, "front" will refer to the direction toward a viewer when the outer end of the dental wedge is on the right when viewed, and "rear" will refer to the direction away from a viewer when the outer end of the dental wedge is on the right when viewed.

Looking at FIGS. 1a to 2c, a first embodiment of a dental wedge 110 according to the invention is shown. The dental wedge 110 includes a longitudinal body 120 that extends from its outer end adjacent a land area 123 to an inner distal tip 138. Extending away from the first vertical land area 123 is a first grasping section 124 having a base 126 and splines 128 that extend outwardly from the base 126. The splines 128 are generally plate-like but can also have other shapes. Extending away from the first grasping section 124 opposite the first vertical land area 123 is a somewhat oval second land 130. The wedge 110 has a generally arcuate bottom surface 149, and a lower edge 111.

The top surface 119 of the wedge 110 can include a single pitch on each side of a top ridge 121. The wedge 110 has a longitudinal intermediate wall 145 at the top surface 119, a longitudinal first side wall 147 connected to the intermediate wall 145, and an opposite longitudinal second side wall 148 connected to the intermediate wall 145. The first side wall 147 includes a first protruding region 112 and a second protruding region 113. The second side wall 148 includes a third protruding region 114 and fourth protruding region 115. A slot 141 is located in the intermediate wall 145 between the first protruding region 112 and the third protruding region 114. The slot 141 defines a throughhole between the first side wall 147 and the second side wall 148. The slot 141 may have a shape selected from teardrop, diamond, circle, oval, or any appropriate shape.

Adjacent the second protruding region 113, a plurality of notches 151 are formed in the first side wall 147 creating a first group of movable tabs 152 of the first side wall 147. Adjacent the fourth protruding region 115, a plurality of notches 163 are formed in the second side wall 148 creating a second group of movable tabs 164 of the second side wall 148.

In order to seat the wedge 110 more precisely between anterior teeth and bicuspids, the wedge 110 has a first concave section 131 between first and second protruding regions 112, 113 and a second concave section 132 between the third and fourth protruding regions 114, 115. The first concave section 131 and the second concave section 132 have a length of about 2 to about 8 millimeters, or about 3 to about 7 millimeters, or about 4 to about 6 millimeters, or about 5 millimeters. In contrast, this dimension can be about 7.5-8.0 millimeters for a wedge used between molars.

Inner end serrations of a cotton pliers can engage the splines 128 of the first grasping section 124 of the dental wedge 110. The dental wedge 110 can press a clear sectional dental matrix against gingiva and a tooth being restored so that the matrix seals the tooth and keeps the filling material inside of the desired space with the wedge 110 separating adjacent teeth so that when the matrix is removed after placing and hardening the filling material, the gap that is formed when the matrix is removed is mitigated as the teeth $T_1$, $T_2$ "spring" back together and close the gap that was present when the matrix was removed.

The wedge 110 is inserted between the teeth $T_1$, $T_2$ with the collapsing distal tip 138 being inserted first while grasping the first grasping section 124 with the cotton pliers as shown in FIGS. 2a-2c. In FIG. 2b, it can be seen how the slot 141 allows the first side wall 147 and the second side wall 148 to flex inward as the tip 138 passes through the interproximal space between teeth $T_1$, $T_2$. The first group of tabs 152 and the second group of tabs 164 engage the teeth $T_1$, $T_2$, respectively as the wedge 110 is advanced further through the interproximal space between teeth $T_1$, $T_2$.

Looking at FIGS. 3a to 3d, a second embodiment of a dental wedge 210 according to the invention is shown. The dental wedge 210 includes a longitudinal body 220 that extends from its outer end adjacent a land area 223 to an inner distal tip 238. Extending away from the first vertical land area 223 is a first grasping section 224 having a base 226 and splines 228 that extend outwardly from the base 226. The splines 228 are generally plate-like but can also have other shapes. Extending away from the first grasping section 224 opposite the first vertical land area 223 is a somewhat oval second land 230. The wedge 210 has a generally arcuate bottom surface 249, and a lower edge 211.

The top surface 219 of the wedge 210 can include a single pitch on each side of a top ridge 221. The wedge 210 has a longitudinal intermediate wall 245 at the top surface 219, a longitudinal first side wall 247 connected to the intermediate wall 245, and a longitudinal second side wall 248 connected to the intermediate wall 245. The first side wall 247 includes a first protruding region 212 and a second protruding region 213. The second side wall 248 includes a third protruding region 214 and fourth protruding region 215.

A portion 241 of the intermediate wall 245 is provided between the first protruding region 212 and the third protruding region 214 to define a portion of material weakness between the first side wall 247 and the second side wall 248. The portion 241 may have a perimeter shape in top view selected from teardrop, diamond, circle, oval, or any appropriate shape. The material weakness can be provided by use of a thickness of the portion 241 of the intermediate wall 245 of the wedge 210 that is abruptly or gradually reduced in a range of 1% to 99%, or 5% to 95%, or 10% to 90%, or 20% to 80%, or 30% to 70%, or 40% to 60%, compared to the surrounding wall thickness of the first side wall 247 and the second side wall 248. The material weakness can also be provided by use a first material in the portion 241 of the intermediate wall 245 that has increased flexibility compared to a second material comprising the surrounding sections of the first side wall 247 and the second side wall 248.

Adjacent the second protruding region 213, a plurality of notches 251 are formed in the first side wall 247 creating a first group of movable tabs 252 of the first side wall 247. Adjacent the fourth protruding region 215, a plurality of notches 263 are formed in the second side wall 248 creating a second group of movable tabs 264 of the second side wall 248.

In order to seat the wedge 210 more precisely between teeth, the wedge 210 has a first concave section 231 between first and second protruding regions 212, 213 and a second concave section 232 between the third and fourth protruding regions 214, 215. The first concave section 231 and the second concave section 232 have a length of about 2 to about 8 millimeters, or about 3 to about 7 millimeters, or about 4 to about 6 millimeters, or about 5 millimeters. In contrast, this dimension can be about 7.5-8.0 millimeters for a wedge used between molars. Inner end serrations of a cotton pliers can engage the splines 228 of the first grasping section 224 of the dental wedge 210.

The dental wedge 210 can press a clear sectional dental matrix against gingiva and a tooth being restored so that the matrix seals the tooth and keeps the filling material inside of the desired space with the wedge 210 separating adjacent teeth so that when the matrix is removed after placing and hardening the filling material, the gap that is formed when the matrix is removed is mitigated as the teeth $T_1$, $T_2$ "spring" back together and close the gap that was present when the matrix was removed. The wedge 210 is inserted between the teeth $T_1$, $T_2$ with the collapsing distal tip 238 being inserted first while grasping the first grasping section 224 with the cotton pliers in a similar manner as shown in FIGS. 2a-2c. The portion 241 of material weakness allows the first side wall 247 and the second side wall 248 to flex inward as the tip 238 passes through the interproximal space between teeth $T_1$, $T_2$. The first group of tabs 252 and the second group of tabs 264 engage the teeth $T_1$, $T_2$, respectively as the wedge 210 is advanced further through the interproximal space between teeth $T_1$, $T_2$.

Looking at FIGS. 4a to 4b, a third embodiment of a dental wedge 310 according to the invention is shown. The dental wedge 310 includes a longitudinal body 320 that extends from its outer end adjacent a land area 323 to an inner distal tip 338. Extending away from the first vertical land area 323 is a first grasping section 324 having a base 326 and splines 328 that extend outwardly from the base 326. The splines 328 are generally plate-like but can also have other shapes. Extending away from the first grasping section 324 opposite the first vertical land area 323 is a somewhat oval second land 330. The wedge 310 has a generally arcuate bottom surface 349, and a lower edge 311.

The top surface 319 of the wedge 310 can include a single pitch on each side of a top ridge 321. The wedge 310 has a longitudinal intermediate wall 345 at the top surface 319, a longitudinal first side wall 347 connected to the intermediate wall 345, and a longitudinal second side wall 348 connected to the intermediate wall 345. The first side wall 347 includes a first protruding region 312 and a second protruding region 313 and a fifth protruding region 370. The second side wall 348 includes a third protruding region 314 and fourth protruding region 315. A slot 341 is located in the intermediate wall 345 between the first protruding regions 312 and the third protruding region 314 defining a throughhole between the first side wall 347 and the second side wall 348. The slot 341 may have a shape selected from teardrop, diamond, circle, oval, or any appropriate shape.

The fifth protruding region 370 of the wedge 310 has advantages. Previous wedges from top view were often either concave in the areas where the wedge engages the teeth or flat (wedge shaped). The cervical or gum area of the teeth, especially bicuspids and molars can have a slight or significant concavity that is described as either fluting or a furcation. It is extremely common in these instances for excess of filling material to squirt through the gap present as the dental matrix arcs across the concavity as the matrix wants to remain flat as it cuts the shortest distance across two prominences. This is referred to as an overhang or excess of filling material and often results in chronically inflamed gum tissues and potential gum disease and aggravation to patient as the floss shreds and snags. The furca is the area where a tooth root divides. A furcal concavity is a depression naturally present in the furcation area of the root of a tooth. The inward dimension of the furcal concavity is larger closer to the apex of the root. However, the concavity is also present near the crown. The inward dimension of the furcal concavity may also be larger from inward decay due to the age of the patient.

The fifth protruding region 370 of the wedge 310 allows the wedge 310 to seat more precisely within the furcation area of the tooth. The convexity of the fifth protruding region 370 provides contact with a tooth surface that may have inward furcation and/or fluting from decay due to the age of the patient. The fifth protruding region 370 can be located at the centerpoint of the body 320, or in an intermediate section of the body 320 adjacent the centerpoint.

Adjacent the second protruding region 313, a plurality of notches 351 are formed in the first side wall 347 creating a first group of movable tabs 352 of the first side wall 347. Adjacent the fourth protruding region 315, a plurality of notches 363 are formed in the second side wall 348 creating a second group of movable tabs 364 of the second side wall 348. Notches can also be provided in the wedge 310 adjacent one or more of the first protruding region 312, the third protruding region 314, and the fifth protruding region 370.

In order to seat the wedge 310 more precisely between teeth, the wedge 310 has a first concave section 331 between the first protruding region 312 and a fifth protruding region 370, and a second concave section 371 between the second and fifth protruding regions 313, 370, and a third concave section 332 between the third and fourth protruding regions 314, 315. The first concave section 331 and the second concave section 371 have a length of about 1 to about 4 millimeters, or about 1.5 to about 3.5 millimeters, or about 2 to about 3 millimeters, or about 2.5 millimeters. The third concave section 332 has a length of about 2 to about 8 millimeters, or about 3 to about 7 millimeters, or about 4 to about 6 millimeters, or about 5 millimeters.

Inner end serrations of a cotton pliers can engage the splines 328 of the first grasping section 324 of the dental wedge 310. The dental wedge 310 can press a clear sectional dental matrix against gingiva and a tooth being restored so that the matrix seals the tooth and keeps the filling material inside of the desired space with the wedge 310 separating adjacent teeth so that when the matrix is removed after placing and hardening the filling material, the gap that is formed when the matrix is removed is mitigated as the teeth $T_1$, $T_2$ "spring" back together and close the gap that was present when the matrix was removed. The wedge 310 is inserted between the teeth $T_1$, $T_2$ with the collapsing distal tip 338 being inserted first while grasping the first grasping section 324 with the cotton pliers in a manner as shown in FIGS. 2a-2c. The slot 341 allows the first side wall 347 and the second side wall 348 to flex inward as the tip 338 passes through the interproximal space between teeth $T_1$, $T_2$. The first group of tabs 352 and the second group of tabs 364 engage the teeth T₁, T₂, respectively as the wedge 310 is advanced further through the interproximal space between teeth T₁, T₂.

Looking at FIGS. 4c to 4d, a fourth embodiment of a dental wedge 410 according to the invention is shown. The dental wedge 410 includes a longitudinal body 420 that extends from its outer end adjacent a land area 423 to an inner distal tip 438. Extending away from the first vertical land area 423 is a first grasping section 424 having a base 426 and splines 428 that extend outwardly from the base 426. The splines 428 are generally plate-like but can also have other shapes. Extending away from the first grasping section 424 opposite the first vertical land area 423 is a somewhat oval second land 430. The wedge 410 has a generally arcuate bottom surface 449, and a lower edge 411.

The top surface 419 of the wedge 410 can include a single pitch on each side of a top ridge 421. The wedge 410 has a longitudinal intermediate wall 445 at the top surface 419, a longitudinal first side wall 447 connected to the intermediate wall 445, and a longitudinal second side wall 448 connected to the intermediate wall 445. The first side wall 447 includes a first protruding region 412 and a second protruding region 413 and a fifth protruding region 470. The fifth protruding region 470 of the wedge 410 allows the wedge 410 to seat more precisely within the furcation area of the tooth. The convexity of the fifth protruding region 470 provides contact with a tooth surface that may have inward furcation and/or fluting from decay due to the age of the patient. The fifth protruding region 470 can be located at the centerpoint of the body 420, or in an intermediate section of the body 420 adjacent the centerpoint.

The second side wall 448 of the wedge 410 includes a third protruding region 414 and fourth protruding region 415. A first slot 441 is located in the intermediate wall 445 between the first protruding regions 412 and the third protruding region 414 defining a throughhole between the first side wall 447 and the second side wall 448. The first slot 441 may have a shape selected from teardrop, diamond, circle, oval, or any appropriate shape. A second slot 481 is located in the intermediate wall 445 between the fifth protruding region 470 and the ridge 421 defining a throughhole between the first side wall 447 and the second side wall 448. The second slot 481 may have a shape selected from teardrop, diamond, circle, oval, or any appropriate shape.

Adjacent the second protruding region 413, a plurality of notches 451 are formed in the first side wall 447 creating a first group of movable tabs 452 of the first side wall 447. Adjacent the fourth protruding region 415, a plurality of notches 463 are formed in the second side wall 448 creating a second group of movable tabs 464 of the second side wall 448. Notches can also be provided in the wedge 410 adjacent one or more of the first protruding region 412, the third protruding region 414, and the fifth protruding region 470.

In order to seat the wedge 410 more precisely between teeth, the wedge 410 has a first concave section 431 between the first protruding region 412 and the fifth protruding region 470, and a second concave section 471 between the second and fifth protruding regions 413, 470, and a third concave section 432 between the third and fourth protruding regions 414, 415. The first concave section 431 and the second concave section 471 have a length of about 1 to about 4 millimeters, or about 1.5 to about 3.5 millimeters, or about 2 to about 3 millimeters, or about 2.5 millimeters. The third concave section 432 has a length of about 2 to about 8 millimeters, or about 3 to about 7 millimeters, or about 4 to about 6 millimeters, or about 5 millimeters.

Inner end serrations of a cotton pliers can engage the splines 428 of the first grasping section 424 of the dental wedge 410. The dental wedge 410 can press a clear sectional dental matrix against gingiva and a tooth being restored so that the matrix seals the tooth and keeps the filling material inside of the desired space with the wedge 410 separating adjacent teeth so that when the matrix is removed after placing and hardening the filling material, the gap that is formed when the matrix is removed is mitigated as the teeth T₁, T₂ "spring" back together and close the gap that was present when the matrix was removed. The wedge 410 is inserted between the teeth T₁, T₂ with the collapsing distal tip 438 being inserted first while grasping the first grasping section 424 with the cotton pliers in a manner as shown in FIGS. 2a-2c. The first slot 441 and the second slot 481 allow the first side wall 447 and the second side wall 448 to flex inward as the wedge 410 passes through the interproximal space between teeth T₁, T₂. The first group of tabs 452 and the second group of tabs 464 engage the teeth T₁, T₂, respectively as the wedge 410 is advanced further through the interproximal space between teeth T₁, T₂.

Looking at FIGS. 5a to 5b, a fifth embodiment of a dental wedge 510 according to the invention is shown. The dental wedge 510 includes a longitudinal body 520 that extends from its outer end adjacent a land area 523 to an inner distal tip 538.

Extending away from the first vertical land area 523 is a first grasping section 524 having a base 526 and splines 528 that extend outwardly from the base 526. The splines 528 are generally plate-like but can also have other shapes. Extending away from the first grasping section 524 opposite the first vertical land area 523 is a somewhat oval second land 530. The wedge 510 has a generally arcuate bottom surface 549, and a lower edge 511.

The top surface 519 of the wedge 510 can include a single pitch on each side of a top ridge 521. The wedge 510 has a longitudinal intermediate wall 545 at the top surface 519, a longitudinal first side wall 547 connected to the intermediate wall 545, and a longitudinal second side wall 548 connected to the intermediate wall 545. The first side wall 547 includes a first protruding region 512 and a second protruding region 513 and a fifth protruding region 570. The fifth protruding region 570 of the wedge 510 allows the wedge 510 to seat more precisely within the furcation area of the tooth. The convexity of the fifth protruding region 570 provides contact with a tooth surface that may have inward furcation and/or fluting from decay due to the age of the patient. The fifth protruding region 570 can be located at the centerpoint of the body 520, or in an intermediate section of the body 520 adjacent the centerpoint.

The second side wall 548 of the wedge 510 includes a third protruding region 514 and a fourth protruding region 515 and a sixth protruding region 590. The sixth protruding region 590 of the wedge 510 allows the wedge 510 to seat more precisely within the furcation area of the tooth. The convexity of the sixth protruding region 590 provides contact with a tooth surface that may have inward furcation and/or fluting from decay due to the age of the patient. The sixth protruding region 590 can be located at the centerpoint of the body 520, or in an intermediate section of the body 520 adjacent the centerpoint.

A first slot 541 is located in the intermediate wall 545 between the first protruding regions 512 and the third protruding region 514 defining a throughhole between the first side wall 547 and the second side wall 548. The first slot 541 may have a shape selected from teardrop, diamond, circle, oval, or any appropriate shape. A second slot 581 is located in the intermediate wall 545 between the fifth protruding region 470 and the sixth protruding region 590 defining a throughhole between the first side wall 547 and the second side wall 548. The second slot 581 may have a shape selected from teardrop, diamond, circle, oval, or any appropriate shape.

Adjacent the second protruding region 513, a plurality of notches 551 are formed in the first side wall 547 creating a first group of movable tabs 552 of the first side wall 547. Adjacent the fourth protruding region 515, a plurality of notches 563 are formed in the second side wall 548 creating a second group of movable tabs 564 of the second side wall 548. Notches can also be provided in the wedge 510 adjacent one or more of the first protruding region 512, the third protruding region 514, the fourth protruding region 515, and the sixth protruding region 590.

In order to seat the wedge 510 more precisely between teeth, the wedge 510 has a first concave section 531 between the first protruding region 512 and the fifth protruding region 570, a second concave section 571 between the second and fifth protruding regions 513, 570, a third concave section 532 between the third and sixth protruding regions 514, 590, and a fourth concave section 579 between the fourth and sixth protruding regions 515, 590. The first concave section 531 and the second concave section 571 and the third concave section 532 and the fourth concave section 579 can have a length of about 1 to about 4 millimeters, or about 1.5 to about 3.5 millimeters, or about 2 to about 3 millimeters, or about 2.5 millimeters.

Inner end serrations of a cotton pliers can engage the splines 528 of the first grasping section 524 of the dental wedge 510. The dental wedge 510 can press a clear sectional dental matrix against gingiva and a tooth being restored so that the matrix seals the tooth and keeps the filling material inside of the desired space with the wedge 510 separating adjacent teeth so that when the matrix is removed after placing and hardening the filling material, the gap that is formed when the matrix is removed is mitigated as the teeth $T_1$, $T_2$ "spring" back together and close the gap that was present when the matrix was removed. The wedge 510 is inserted between the teeth $T_1$, $T_2$ with the collapsing distal tip 538 being inserted first while grasping the first grasping section 524 with the cotton pliers in a manner as shown in FIGS. 2a-2c. The first slot 541 and the second slot 581 allow the first side wall 547 and the second side wall 548 to flex inward as the wedge 510 passes through the interproximal space between teeth $T_1$, $T_2$. The first group of tabs 552 and the second group of tabs 564 engage the teeth $T_1$, $T_2$, respectively as the wedge 510 is advanced further through the interproximal space between teeth $T_1$, $T_2$.

Looking at FIGS. 5c to 5d, a sixth embodiment of a dental wedge 610 according to the invention is shown. The dental wedge 610 includes a longitudinal body 620 that extends from its outer end adjacent a land area 623 to an inner distal tip 638.

Extending away from the first vertical land area 623 is a first grasping section 624 having a base 626 and splines 628 that extend outwardly from the base 626. The splines 628 are generally plate-like but can also have other shapes. Extending away from the first grasping section 624 opposite the first vertical land area 623 is a somewhat oval second land 630. The wedge 610 has a generally arcuate bottom surface 649, and a lower edge 611.

The top surface 619 of the wedge 610 can include a single pitch on each side of a top ridge 621. The wedge 610 has a longitudinal intermediate wall 645 at the top surface 619, a longitudinal first side wall 647 connected to the intermediate wall 645, and a longitudinal second side wall 648 connected to the intermediate wall 645. The first side wall 647 includes a first protruding region 612 and a second protruding region 613 and a fifth protruding region 670. The fifth protruding region 670 of the wedge 610 allows the wedge 610 to seat more precisely within the furcation area of the tooth. The convexity of the fifth protruding region 670 provides contact with a tooth surface that may have inward furcation and/or fluting from decay due to the age of the patient. The fifth protruding region 670 can be located at the centerpoint of the body 620, or in an intermediate section of the body 620 adjacent the centerpoint.

The second side wall 648 of the wedge 610 includes a third protruding region 614 and a fourth protruding region 615 and a sixth protruding region 690. The sixth protruding region 690 of the wedge 610 allows the wedge 610 to seat more precisely within the furcation area of the tooth. The convexity of the sixth protruding region 690 provides contact with a tooth surface that may have inward furcation and/or fluting from decay due to the age of the patient. The sixth protruding region 690 can be located at the centerpoint of the body 620, or in an intermediate section of the body 620 adjacent the centerpoint.

A slot 641 is located in the intermediate wall 645 between the first protruding region 612 and the third protruding region 614 defining a throughhole between the first side wall 647 and the second side wall 648. The slot 641 may have a shape selected from teardrop, diamond, circle, oval, or any appropriate shape.

Adjacent the second protruding region 613, a plurality of notches 651 are formed in the first side wall 647 creating a first group of tabs 652 of the first side wall 647. Adjacent the fourth protruding region 615, a plurality of notches 663 are formed in the second side wall 648 creating a second group of tabs 664 of the second side wall 648. Notches can also be provided in the wedge 610 adjacent one or more of the first protruding region 612, the third protruding region 614, the fourth protruding region 615, and the sixth protruding region 690.

In order to seat the wedge 610 more precisely between teeth, the wedge 610 has a first concave section 631 between the first protruding region 612 and a fifth protruding region 670, a second concave section 671 between the second and fifth protruding regions 613, 670, a third concave section 632 between the third and sixth protruding regions 614, 690, and a fourth concave section 679 between the fourth and sixth protruding regions 615, 690. The first concave section 631 and the second concave section 671 and the third concave section 632 and the fourth concave section 679 can have a length of about 1 to about 4 millimeters, or about 1.5 to about 3.5 millimeters, or about 2 to about 3 millimeters, or about 2.5 millimeters.

Inner end serrations of a cotton pliers can engage the splines 628 of the first grasping section 624 of the dental wedge 610. The dental wedge 610 can press a clear sectional dental matrix against gingiva and a tooth being restored so that the matrix seals the tooth and keeps the filling material inside of the desired space with the wedge 610 separating adjacent teeth so that when the matrix is removed after placing and hardening the filling material, the gap that is formed when the matrix is removed is mitigated as the teeth $T_1$, $T_2$ "spring" back together and close the gap that was present when the matrix was removed. The wedge 610 is inserted between the teeth $T_1$, $T_2$ with the collapsing distal tip 638 being inserted first while grasping the first grasping section 624 with the cotton pliers in a manner as shown in FIGS. 2a-2c. The slot 641 allows the first side wall 647 and the second side wall 648 to flex inward as the wedge 610 passes through the interproximal space between teeth $T_1$, $T_2$. The first group of tabs 652 and the second group of tabs 664 engage the teeth $T_1$, $T_2$, respectively as the wedge 610 is advanced further through the interproximal space between teeth $T_1$, $T_2$.

Various polymeric materials can be used to mold the dental wedges 110, 210, 310, 410, 510, 610. The wedges 110, 210, 310, 410, 510, 610 can be molded from a polymeric material that forms an opaque body. "Opaque" means the polymeric material transmits very little light, and therefore reflects, scatters, or absorbs most of it. Non-limiting examples of polymeric materials for forming the wedges 110, 210, 310, 410, 510, 610 include polycarbonates (e.g., Lexan® polycarbonate), acrylics (e.g., polymethylmethacrylate), polyesters (e.g., polyethylene terephthalate), polyolefins (e.g., polyethylene, polypropylene) and polyoxymethylene (e.g., Delrin® with a modulus of about 3,000 MPa).

Thus, the invention provides improved dental wedges that may be used in the restoration of a decayed portion of a tooth.

Although the invention has been described in considerable detail with reference to certain embodiments, one skilled in the art will appreciate that the present invention can be practiced by other than the described embodiments, which have been presented for purposes of illustration and not of limitation. Therefore, the scope of the appended claims should not be limited to the description of the embodiments contained herein.

What is claimed is:

1. A dental wedge for creating space between adjacent teeth, the dental wedge comprising:
   an elongated body extending from an outer end to an opposite inner end, the body comprising a longitudinal first side wall connected to a longitudinal second side wall, the first side wall and the second side wall each being spaced apart creating an inverted generally V-shaped transverse section for the body, the body having a top surface and a bottom surface,
   wherein the body includes a region of increased flexibility compared to each of the first side wall and the second side wall,
   wherein the region of increased flexibility comprises a throughhole in the body through the first side wall and the second side wall only at the inner end of the elongated body of the dental wedge, the throughhole extending from the top surface to the bottom surface,
   wherein the inner end of the dental wedge at the longitudinal first side wall and at the longitudinal second side wall decreases in cross-section in a direction away from the outer end of the dental wedge to define a distal tip of the dental wedge, and
   wherein the dental wedge includes a ridge defined between the longitudinal first side wall and the longitudinal second side wall, the ridge including a first portion and a second portion that are positioned on opposing sides of the throughhole, the first portion of the ridge extending along a central region of the dental wedge between the throughhole and the outer end, the second portion of the ridge being between the throughhole and the distal tip of the dental wedge at the inner end;
   wherein when the dental wedge is inserted between adjacent teeth and the distal tip of the dental wedge contacts one or both of the adjacent teeth, the first side wall and the second side wall are configured to flex inward at the throughhole while being advanced between the adjacent teeth, and
   wherein when the dental wedge is further inserted between the adjacent teeth with the first side wall and the second side wall flexed inward, the first side wall and the second side wall are configured to automatically expand at the throughhole when the throughhole is advanced past the adjacent teeth.

2. The dental wedge of claim 1 wherein:
   the first side wall includes a first outwardly protruding region when viewed in a top view of the body, and a first concave region adjacent the first outwardly protruding region,
   the second side wall includes a second outwardly protruding region when viewed in a top view of the body, and
   the region of increased flexibility is positioned between the first outwardly protruding region and the second outwardly protruding region, such that the region of increased flexibility is positioned at an intersection between the first outwardly protruding region and the second outwardly protruding region.

3. The dental wedge of claim 2 wherein:
   the first outwardly protruding region and the second outwardly protruding region are located adjacent the inner end of the body.

4. The dental wedge of claim 2 wherein:
   the first side wall includes a third outwardly protruding region located adjacent the outer end of the body, the first outwardly protruding region and the third outwardly protruding region defining the first concave section of the first side wall, and
   the second side wall includes a fourth outwardly protruding region located adjacent the outer end of the body, the second outwardly protruding region and the fourth outwardly protruding region defining a second concave section of the second side wall.

5. The dental wedge of claim 4 wherein:
   the third outwardly protruding region of the first side wall includes notches defining at least one movable tab in the first side wall, and
   the fourth outwardly protruding region of the second side wall includes notches defining at least one movable tab in the second side wall.

6. The dental wedge of claim 2, wherein the first side wall includes a third outwardly protruding region and a fourth outwardly protruding region when viewed in a top view of the body, and
   wherein the third outwardly protruding region is positioned between the first outwardly protruding region and the fourth outwardly protruding region.

7. The dental wedge of claim 1, further comprising a second region of increased flexibility compared to each of the first side wall and the second side wall.

8. The dental wedge of claim 7 wherein:
   the second region of increased flexibility comprises a second throughhole in the body.

9. The dental wedge of claim 7 wherein:
   the second region of increased flexibility comprises a portion of material weakness between the first side wall and the second side wall.

10. The dental wedge of claim 1, wherein the inner end of the elongated body is configured to be inserted first into an interproximal space between adjacent teeth, and advanced within the interproximal space until the first side wall flexes inward and the second side wall flexes inward at the throughhole.

11. A dental wedge for creating space between adjacent teeth, the dental wedge comprising:
   an elongated body extending from an outer end to an opposite inner end, the body comprising a longitudinal first side wall connected to a longitudinal second side wall, the first side wall and the second side wall each being spaced apart creating an inverted generally V-shaped transverse section for the body, the body having a top surface and a bottom surface,
   wherein the first side wall includes a first outwardly protruding region defining a first local maxima when viewed in a top view of the body having notches defining a first, second, and third movable tab in the first side wall;
   wherein the second moveable tab is positioned between the first moveable tab and the third moveable tab, the second moveable tab being longer than the first moveable tab and longer than the third moveable tab;
   wherein the elongated body includes a throughhole in the first side wall and the second side wall of the elongated body only at the inner end of the wedge;
   wherein the inner end of the dental wedge at the longitudinal first side wall and at the longitudinal second side wall decreases in cross-section in a direction away from the outer end of the dental wedge to define a distal tip of the dental wedge; wherein the dental wedge includes a ridge defined between the longitudinal first side wall and the longitudinal second side wall, the ridge including a first portion and a second portion that are positioned on opposing sides of the throughhole, the first portion of the ridge extending along a central region of the dental wedge between the throughhole and the outer end, the second portion of the ridge being between the throughhole and the distal tip of the dental wedge at the inner end,
   wherein when the dental wedge is inserted between adjacent teeth, the first side wall and the second side wall are configured to flex inward at the throughhole; and
   wherein when the dental wedge is further inserted between the adjacent teeth and the distal tip of the dental wedge contacts one or both of the adjacent teeth, the first side wall and the second side wall flex inward at the throughhole, and
   wherein when the dental wedge is further inserted between the adjacent teeth with the first side wall and the second side wall flexed inward, the first side wall and the second side wall are configured to automatically expand at the throughhole when the throughhole is advanced past the adjacent teeth.

12. The dental wedge of claim 11 wherein:
   the second side wall includes a second outwardly protruding region having notches defining at least one movable tab in the second side wall.

13. The dental wedge of claim 12 wherein:
   the first outwardly protruding region of the first side wall is located adjacent the outer end of the body, and
   the second outwardly protruding region of the second side wall is located adjacent the outer end of the body.

14. The dental wedge of claim 13, wherein the throughhole is a first region of increased flexibility compared to the each of the first side wall and the second side wall, and further comprising a second region of increased flexibility compared to each of the first side wall and the second side wall.

15. The dental wedge of claim 14 wherein:
   the second region of increased flexibility comprises a throughhole in the body.

16. A dental wedge comprising:
   a first longitudinal side wall including a first protruding region, the first protruding region defining a first local maxima when the dental wedge is viewed in a top view;
   a second longitudinal side wall including a second protruding region, the second protruding region defining a second local maxima when the dental wedge is viewed in a top view;
   a ridge defined between the first longitudinal side wall and the second longitudinal side wall, the first longitudinal side wall and the second longitudinal side wall being spaced apart creating an inverted generally V-shaped transverse section for the dental wedge; and
   a throughhole directed through the dental wedge at the ridge and only at a first end of the dental wedge opposite a second end of the dental wedge, the throughhole being positioned at an intersection between the first protruding region and the second protruding region; wherein the ridge includes a first portion and a second portion that are positioned on opposing sides of the throughhole, the first portion of the ridge extending along a central region of the dental wedge between the throughhole and the second end, the second portion of the ridge being between the throughhole and a distal tip of the dental wedge at the first end;
   wherein when the dental wedge is inserted between adjacent teeth and the distal tip of the dental wedge contacts one or both of the adjacent teeth, the first side wall and the second side wall are configured to flex inward at the throughhole while being advanced between the adjacent teeth; and
   wherein when the dental wedge is further inserted between the adjacent teeth with the first side wall and the second side wall flexed inward, the first side wall and the second side wall are configured to automatically expand at the throughhole when the throughhole is advanced past the adjacent teeth.

17. The dental wedge of claim 16, wherein the throughhole has a perimeter shape that is a diamond or a teardrop.

18. The dental wedge of claim 16, wherein the first longitudinal side wall includes a third protruding region when the dental wedge is viewed in a top view, and a concave region positioned between the first protruding region and the third protruding region of the first longitudinal side wall.

19. The dental wedge of claim 16, wherein the first end of the dental wedge at the first longitudinal side wall and at the second longitudinal side wall decreases in cross-section in a direction away from the second end of the dental wedge to define a distal tip of the dental wedge.

20. The dental wedge of claim 19, wherein a first section of the first longitudinal side wall that decreases in cross-section to define the distal tip of the dental wedge is curved; and
   wherein a second section of the second longitudinal side wall that decreases in cross-section to define the distal tip of the dental wedge is curved.

21. The dental wedge of claim 16, wherein the throughhole is only at the first end of the dental wedge;
   wherein the first longitudinal side wall includes a third protruding region when the dental wedge is viewed in a top view;
   wherein the second longitudinal side wall includes a fourth protruding region when the dental wedge is viewed in a top view; and wherein the dental wedge further comprises:
- a first concave region positioned between the first protruding region and the third protruding region of the first longitudinal side wall, the first concave region defining a first local minima when the dental wedge is viewed in a top view, the first local minima being at a central region of the dental wedge; and
- a second concave region positioned between the second protruding region and the fourth protruding region of the second longitudinal side wall, the second concave region defining a second local minima when the dental wedge is viewed in the top view, the second local minima being at the central region of the dental wedge; and wherein the throughhole is not positioned at an intersection between the first local minimum and the second local minimum.

22. The dental wedge of claim 16, wherein the first longitudinal side wall includes a third protruding region when the dental wedge is viewed in a top view,
wherein the first longitudinal side wall includes a fourth protruding region when the dental wedge is viewed in a top view,
wherein the second longitudinal side wall includes a fifth protruding region when the dental wedge is viewed in a top view,
wherein the second longitudinal side wall includes a sixth protruding region when the dental wedge is viewed in a top view,
wherein the first protruding region is positioned between the third protruding region and the fourth protruding region, and
wherein the second protruding region is positioned between the fifth protruding region and the sixth protruding region.

23. The dental wedge of claim 22, wherein the throughhole is a first throughhole, and further comprising a second throughhole directed through the dental wedge at the ridge, the first throughhole being separated from the second throughhole, and
wherein the second throughhole is positioned at an intersection between the third protruding region and the fifth protruding region.

* * * * *